(12) United States Patent
Wilson et al.

(10) Patent No.: US 9,254,062 B2
(45) Date of Patent: Feb. 9, 2016

(54) COOKING DEVICE

(75) Inventors: Alec Wilson, West Lothian (GB); Robert James Petrie, Livingston (GB)

(73) Assignee: John Bean Technologies AB, Helsingborg (SE)

( * ) Notice: Subject to any disclaimer, the term of this patent is extended or adjusted under 35 U.S.C. 154(b) by 967 days.

(21) Appl. No.: 13/500,895

(22) PCT Filed: Oct. 12, 2010

(86) PCT No.: PCT/EP2010/065280
§ 371 (c)(1),
(2), (4) Date: Jun. 27, 2012

(87) PCT Pub. No.: WO2011/045315
PCT Pub. Date: Apr. 21, 2011

(65) Prior Publication Data
US 2012/0263846 A1    Oct. 18, 2012

(30) Foreign Application Priority Data

Oct. 12, 2009 (EP) .................................... 09012885

(51) Int. Cl.
*A21B 1/42* (2006.01)
*A47J 37/04* (2006.01)
(52) U.S. Cl.
CPC .................................... *A47J 37/045* (2013.01)
(58) Field of Classification Search
CPC ............. A21B 1/42; A23P 1/10; A47J 37/00; A47J 37/04; A47J 37/045
USPC ........................................................ 426/521
See application file for complete search history.

(56) References Cited

U.S. PATENT DOCUMENTS 4,197,792 A * 4/1980 Mendoza ......................... 99/349
4,667,589 A * 5/1987 Bishop ............................ 99/386
(Continued)

FOREIGN PATENT DOCUMENTS

EP    0 655 215 A1    11/1994
EP    1 106 067 A1    11/2000
(Continued)

OTHER PUBLICATIONS

International Search Report mailed Nov. 7, 2011, issued in corresponding International Application No. PCT/EP2010/065280, filed Oct. 12, 2010.

*Primary Examiner* — Steven Leff
(74) *Attorney, Agent, or Firm* — Christensen O'Connor Johnson Kindness PLLC

(57) ABSTRACT

The present invention relates to a cooking device for cooking of foodstuffs, comprising a cooking chamber, a product conveyor, a shape-controlling belt, and a lifting member, the product conveyor being arranged to convey said foodstuffs through said cooking chamber, the shape-controlling belt being an endless belt extending along an upper return path, and a lower work path, the lifting member being arranged to shift a part of the lower work path between a first position in which the belt extending along said part is slacking and is adopted to contact said foodstuffs on the product conveyor, and a second position in which the belt extending along said part is adopted to be separated from said foodstuffs on the product conveyor. The invention further relates to a method for switching a cooking device between being adapted for shape-controlled cooking and non-shape-controlled cooking of foodstuffs, and use of the cooking device.

20 Claims, 3 Drawing Sheets

(56) References Cited

U.S. PATENT DOCUMENTS

| | | | |
|---|---|---|---|
| 5,044,264 A * | 9/1991 | Forney | 99/349 |
| 5,458,051 A * | 10/1995 | Alden et al. | 99/349 |
| 5,588,354 A * | 12/1996 | Stuck et al. | 99/386 |
| 6,044,960 A * | 4/2000 | Cloud et al. | 198/493 |
| 6,745,671 B2 * | 6/2004 | Kuenen | 99/349 |
| 7,067,769 B2 * | 6/2006 | Sands et al. | 219/388 |
| 7,231,749 B2 * | 6/2007 | Garceau et al. | 53/403 |
| 8,549,994 B2 * | 10/2013 | Mole | 99/467 |
| 8,808,780 B2 * | 8/2014 | Fredlund | 426/517 |

FOREIGN PATENT DOCUMENTS

| | | |
|---|---|---|
| EP | 1 269 868 A1 | 6/2002 |
| WO | 00/01285 A1 | 1/2000 |

* cited by examiner

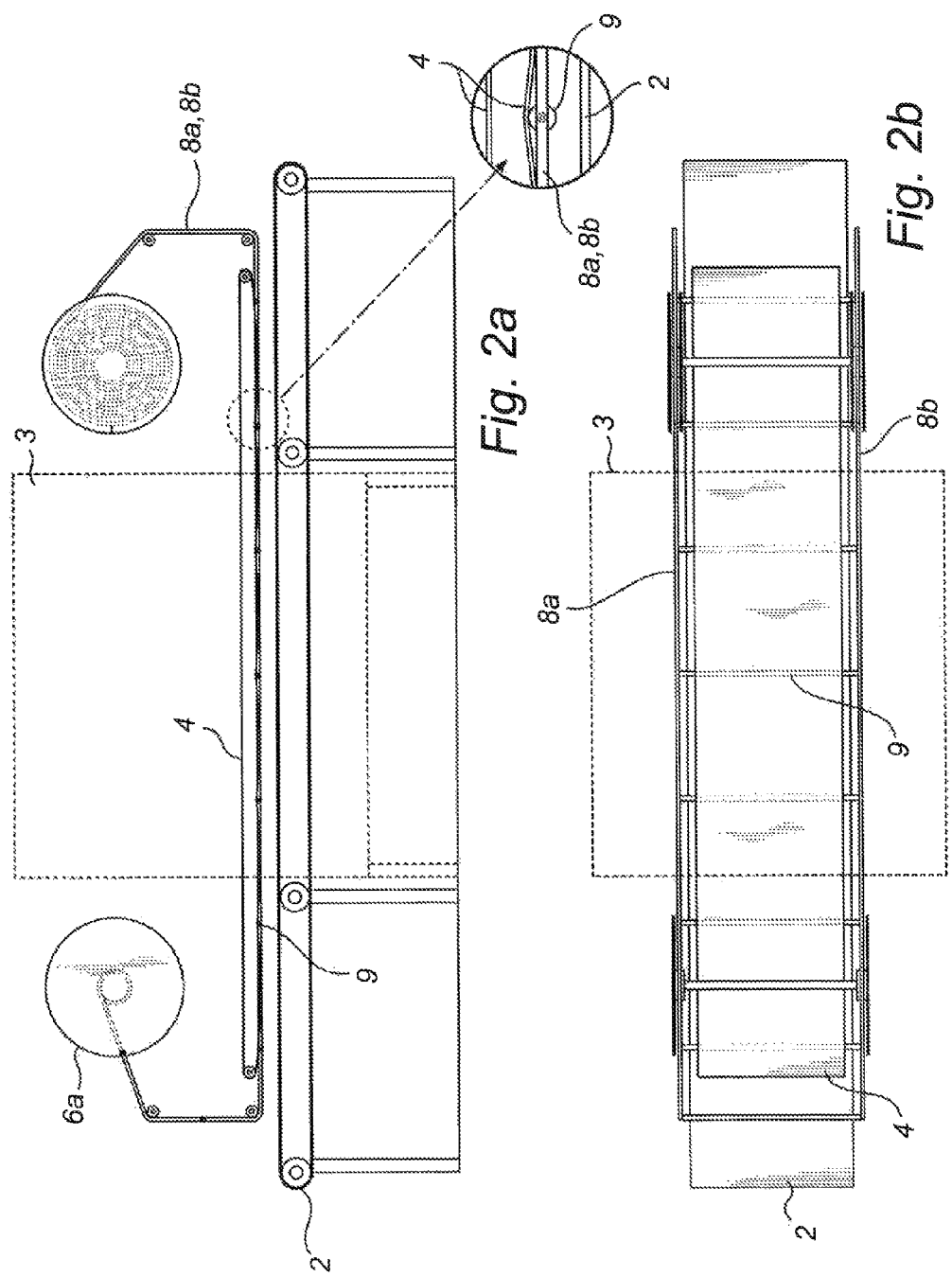

COOKING DEVICE

TECHNICAL FIELD

The present invention relates to a cooking device for cooking of foodstuffs.

BACKGROUND ART

Large scale cooking, such as industrial cooking of foodstuffs, is of a growing interest, particularly as the demand for products such as pre-cooked dishes is increasing. In industrial cooking, it is often desired that certain properties of the products, such as shape and surface structure, are controlled and that products with little variation over time with regards to the desired properties can be delivered.

It is known to cook foodstuffs positioned between surfaces. In the American patent with number U.S. Pat. No. 6,745,671, cooking in oil of meat products positioned on a feed belt with a top belt preventing the products from floating in the oil is disclosed. There is, however, a need for of cooking equipment efficiently handling shape-controlled cooking and non-shape-controlled cooking of foodstuffs.

SUMMARY OF THE INVENTION

It is an object of the present invention to make available an efficient cooking device for shape-controlled cooking of foodstuffs, as well as non-shape-controlled cooking of foodstuffs.

According to a first aspect of the invention the object is achieved by means of a cooking device for cooking of foodstuffs, comprising a cooking chamber, a product conveyor, a shape-controlling belt, and a lifting member, the product conveyor being arranged to convey said foodstuffs through said cooking chamber, the shape-controlling belt being an endless belt extending along an upper return path, and a lower work path, the lifting member being arranged to shift a part of the lower work path between a first position in which the belt extending along said part is slacking and is adopted to contact said foodstuffs on the product conveyor, and a second position in which the belt extending along said part is adapted to be separated from said foodstuffs on the product conveyor.

The cooking chamber can be a chamber which can be heated, such as an oven. Thereby, several different types of cooking is possible with the cooking device, such as baking, frying, grilling, toasting, surface treatment, or steam cooking, or combinations thereof.

The product conveyor conveys the foodstuffs through the cooking chamber, and the foodstuffs are being cooked as they are inside the cooking chamber. The product conveyor thus enables continuous cooking of foodstuffs, but also batch cooking. The product conveyor also enables transport of foodstuffs through the cooking chamber.

The shape-controlling belt according to the invention is an endless belt.

The shape-controlling belt according to the invention, can be in contact with the foodstuffs on the product conveyor. When the shape-controlling belt is in contact with the foodstuffs on the product conveyor, the shape-controlling belt may control the shape of the product. Controlling the shape may comprise providing the surface of the foodstuffs being in contact with the shape-controlling belt, a flat, smooth or patterned appearance, and/or restricting or controlling the height, thickness or size of the foodstuffs. For example, controlling the shape may comprise making or keeping foodstuffs flat. Furthermore, controlling the shape may comprise limiting or preventing the rising of the foodstuffs, for example in case of baking of dough, for example, into breads.

The shape-controlling belt may be made of metal, such as steel or stainless steel, or any other material being suitable for the purpose of controlling the shape of foodstuffs during cooking according to the invention.

The lifting member according to the invention, allows the shape-controlling belt to be shifted between a first position and a second position, wherein the shape-controlling belt in the first position is closer to the product conveyor compared to the shape-controlling belt in the second position. Thus, the first position may allow the shape-controlling belt to contact foodstuffs on the product conveyor, while the second position may allow the belt not to contact foodstuffs on the product conveyor. Thus, the lifting member can be used to shift the shape-controlling belt between controlling the shape of the foodstuffs being cooked, or not controlling the shape of the foodstuffs being cooked. In the first position, the shape-controlling belt may be in contact with the product conveyor.

Thus, the device according to the invention can be used efficiently for shape-controlled cooking and/or for non-shape-controlled cooking.

The lifting member may further be used for increasing the space between the product conveyor and the shape-controlling belt, thereby giving better access, for example for inspections or maintenance to the device.

Said slacking enables the lifting member to shift the shape-controlling belt between said first position and said second position.

Said slacking further enables the lifting member to shift the shape-controlling belt, between said first position and said second position, without shifting the whole of the shape-controlling belt, as simply the slack of the belt has to be shifted. Thus the shifting is easy and efficient.

Cooking according to the invention can for example be baking, frying, grilling, toasting, surface treatment, or steam cooking, or combinations thereof. According to the invention, the surfaces of the product conveyor and of the lower work path of the shape-controlling belt, being in contact with foodstuffs may be essentially parallel.

The lifting member according to the invention may comprise a structure supported on at least one lateral side of the shape-controlling belt, said structure being insertable between the shape-controlling belt and the product conveyor such that the structure engage the shape-controlling belt in order to shift said part of the work path from said first position to said second position.

A structure being insertable between the shape-controlling belt and the product conveyor is an easy, reliable and efficient way for the structure to engage the shape-controlling belt, and thus for the structure to shift said part of the lower work path between said first position and said second position. Thus the structure may be used to allow the device according to the invention to be used efficiently for shape-controlled cooking and/or for non-shape-controlled cooking, and the device may efficiently be shifted between shape-controlled cooking and/or for non-shape-controlled cooking. Thus the device may be used by users desiring shape-controlled cooking according to the invention, by users desiring non-shape-controlled cooking, and by users desiring to be able to alter between shape-controlled and non-shape-controlled cooking.

Non-shape-controlled cooking, as discussed herein, can be regarded as cooking without the shape-controlling belt being in contact with the foodstuffs on the product conveyor, and thus cooking without the shape-controlling belt effecting the foodstuffs.

The structure being supported on at least one lateral side of the shape-controlling belt is an efficient way of controlling the structure. It may be more efficient to support the structure on both lateral sides of the shape-controlling belt.

The lifting member according to the invention may comprise a lateral supporting means arranged on at least one lateral side of the shape-controlling belt, wherein said lateral supporting means is supporting said structure.

A lateral supporting means arranged on at least one lateral side of the shape-controlling belt is an efficient means for supporting the structure and allowing the structure to be moved in the elongated direction of the shape-controlling belt.

The structure according to the invention may be transversal spaced apart rods being movable in the longitudinal extension of the product conveyor. Such rods may be cost-effective, require little space, and be rolled up on rolls.

The lateral supporting means of said lifting member according to the invention may comprise two support lines, such as chains or wires, one support line being arranged on each lateral side of the shape-controlling belt, wherein said lateral supporting means supports transversal spaced apart rods being movable in the longitudinal extension of the product conveyor.

Such support lines being arranged on each lateral side of the shape-controlling belt allows for stable support of said spaced apart rods, and allows for easy and efficient movement in the longitudinal extension of the product conveyor. Said support lines further makes it possible and easy to insert said rods between the shape-controlling belt and the product conveyor such that the structure engage the shape-controlling belt in order to shift said part of the work path from said first position to said second position.

Said rods may be rotatably attached to the support lines. Such rotatably attached rods may be beneficial for supporting the shape-controlling belt, when the shape-controlling belt is moving. Such rotatably attached rods may prevent undesired scraping off of residues of foodstuffs or material from the shape-controlling belt.

The support lines may be, for example, chains, wires, ropes, belts, or any other suitable objects.

The two support lines may at each end be engaged with a moving member arranged to move the support lines in the longitudinal extension of the product conveyor. Thus, the support lines can be moved back and/or forth. Thus, said structure or transversal spaced apart rods can be moved in the longitudinal extension of the product conveyor and inserted between the shape-controlling belt and the product conveyor, such that said part of the work path is shifted from said first position to said second position. It is realised that the process may be reversed such that said part of the work path may be shifted from said second position to said first position.

The moving member may be, for example, a roll, a reel, or a wheel. The moving member may be incorporated with a means for turning or rotating the moving member. Said turning or rotating can be clock-wise or anti-clock-wise. For example a gear unit powered by an electric motor or a hydraulic motor may be used for said turning or rotating.

The rods are transversal in relation to the elongation of the belt.

The supporting means may comprise one section supporting transversal spaced apart rods and one section without transversal spaced apart rods. The supporting means may also comprise at least one section supporting transversal spaced apart rods and at least one section without transversal spaced apart rods.

The support lines according to the invention may be supported on support rails, one rail for each support line, with elongation in the direction of the support lines. Such rails may be beneficial for keeping the support lines at a suitable and/or predetermined level in relation to the product conveyor and/or the shape-controlling belt. Furthermore, the support rails may be efficient for keeping the support lines essentially parallel to the product conveyor and/or the lower work path of the shape-controlling belt.

The rails may be mounted to inside walls of the cooking chamber. The rails may be adjustably mounted to the inside walls of the cooking chamber such that the height of the rails above the product belt may be adjusted, and thus the height to which the lower work path of the shape-controlling belt may be elevated above the product belt may be adjusted.

The lower work path of the shape-controlling belt in the second position is at a distance from the product conveyor. Said distance may be, for example, 1-20, 2-10, 3-9, or 4-8 cm. For example, the distance may be 7.5 cm.

The shape-controlling belt may be slacking between the rods, according to the invention, when the lower work path is in said second position.

Said part according to the invention is a portion of the lower work path or the whole of the lower work path. Thus, a portion or the whole of the lower work path may be engaged in shape-controlled cooking, or a portion or the whole of the lower work path may be engaged in non-shape-controlled cooking. The cooking device according to the invention may thus be used, for example, such that the foodstuffs are cooked with shape-control in the first part of the cooking chamber and with non-shape-controlled cooking in the last part of the cooking chamber, or vice versa.

Each of the product conveyor, the shape-controlling belt, and the lifting member may have an extension outside of the cooking chamber. Thus, for example, the foodstuffs may be positioned on the product conveyor outside of the cooking chamber, after which the foodstuffs are conveyed into the cooking chamber in which the food stuffs are subjected to shape-controlled cooking or non-shape-controlled cooking, after which the cooked foodstuffs are conveyed out of the cooking chamber for possible further treatment.

The product conveyor according to the invention may be a conveyor belt. The product conveyor according to the invention may further be an endless conveyor belt. A conveyor belt, or an endless conveyor belt, is an efficient means of conveying foodstuffs according to the invention.

The product conveyor, such as an endless conveyor belt, may be made of metal, such as steel or stainless steel. Such a material lends the product conveyor suitable properties for baking at high temperatures and suitable properties, for example, with regards to cleaning and strength.

The shape-controlling belt according to the invention may be movable.

The shape-controlling belt may be movable such that when the shape-controlling belt is extending along said lower work path, the shape-controlling belt presents a velocity which corresponds to the velocity with which the foodstuffs are transported.

The first position of said part of the lower work path may result in shape-controlled cooking of foodstuffs, and the second position of said part of the lower work path may result in non-shape-controlled cooking. Thus, it is possible to use the cooking device according to the invention both for shape-controlled cooking and for non-shape-controlled cooking. The lifting member enables switching between shape-controlled cooking and for non-shape-controlled cooking.

According to a second aspect of the invention, a method is proposed for switching a cooking device between being adapted for shape-controlled cooking and non-shape-controlled cooking of foodstuffs, using the cooking device according to the invention, comprising the step of shifting a part of the lower work path between a first position in which the belt extending along said part is slacking and is adopted to contact said foodstuffs and shape-controlled cooking, and a second position in which the belt extending along said part is adopted to be separated from said foodstuffs on the product conveyor and non-shape-controlled cooking.

Thus, said method allows a single device to be used for shape-controlled cooking as well as non-shape-controlled cooking. Such a method allows different foodstuffs to be cooked using the same cooking device, without the necessity of having two cooking devices or one cooking device which has to be rebuilt.

According to a third aspect of the invention, a use of the cooking device according to the invention, is proposed for cooking of foodstuffs.

The foodstuffs according to the invention may be, for example, bread, rolls, buns, pies, pizzas, pitta bread, pizza bases, tortilla chips, sausages, burgers, or bacon. The cooking may be, for example, baking, grilling, frying, toasting, surface treatment, or steam cooking, or combinations thereof.

The foodstuffs may be positioned directly on the belt, or, for example, on trays.

The shape-controlled cooking may be used to control the flatness and the thickness of foodstuffs being cooked. For example with bacon, shape-controlled cooking may be used to obtain flat bacon, while non-shape-controlled cooking typically results in wavy bacon. With some foodstuffs, for example bread, it is sometimes desired that the bread is baked with shape-control, for example if a flat surface is desired on the bread which may be the case, for example, with loafs to be used for toasts or pizza bases; while it is sometimes desired that the bread has a natural uneven crust, which may make the bread look more natural and appetising. The use of the cooking device according to the invention allows for easy and efficient switching between shape-controlled cooking and non-shape-controlled cooking.

The use of the cooking device according to the invention may be for shape-controlled cooking.

The use of the cooking device according to the invention may be for non-shape-controlled cooking.

The use of the cooking device according to the invention may be for baking of bacon.

The use of the cooking device according to the invention may be for cooking, wherein the cooking is a combination of shape-controlled cooking and non-shape-controlled cooking.

Relevant parts of the explanations given above with regard to the device are also applicable to the method and use of the device. Reference is hereby made to these explanations.

BRIEF DESCRIPTION OF THE DRAWINGS

FIG. 2a illustrates the cooking device according to the invention, as viewed from the side, wherein a part of the lower work path is in the second position.

FIG. 2b illustrates the cooking device according to the invention, as viewed from above, wherein a part of the lower work path is in the second position.

DETAILED DESCRIPTION

The invention will now be explained in more detail, and specific preferred embodiments, and variations of these, will be shown. The explanations are intended for illustrative and explanatory purposes and are not to be seen in any way as limiting the scope of the invention. The illustrations are schematic and all details are not illustrated, and all illustrated details may not be necessary for the invention.

A specific embodiment of the invention will now be discussed with reference to FIGS. 1a and 1b.

Figure 1A:
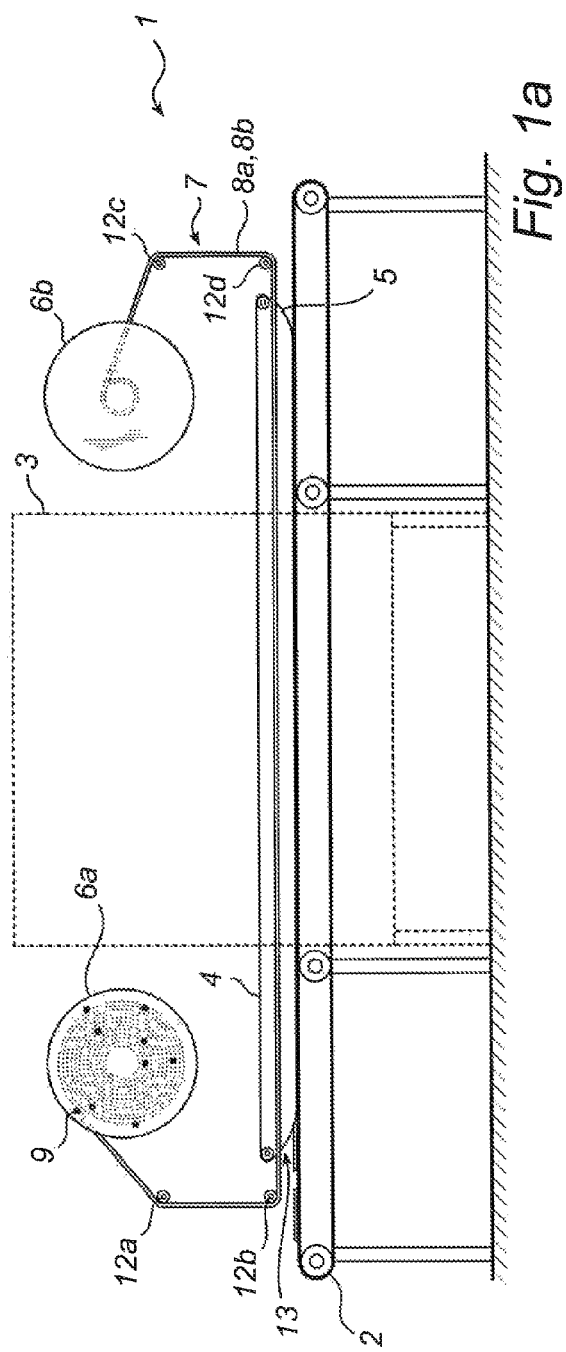
FIG. 1a illustrates the cooking device according to the invention, as viewed from the side, wherein a part of the lower work path is in the first position.
Figure 1B:
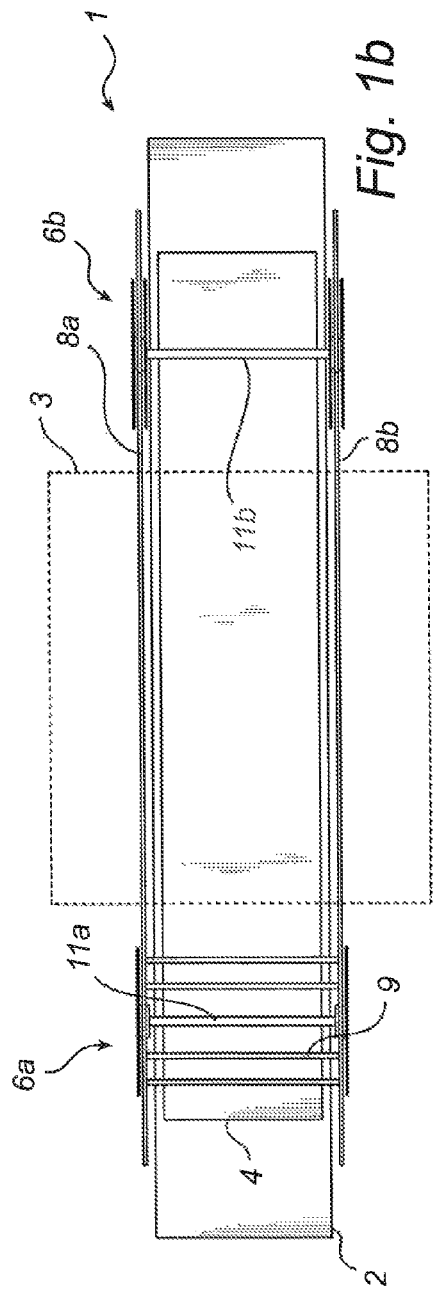
FIG. 1b illustrates the cooking device according to the invention, as viewed from above, wherein a part of the lower work path is in the first position.

A cooking device 1 according to the invention is illustrated in FIGS. 1a and 1b. The product conveyor 2 is horizontally mounted and runs through a cooking chamber 3 (illustrated as a see-through box for improving the clarity). A shape-controlling belt 4 is positioned on top of the product conveyor. The shape-controlling belt 4 is an endless belt made of stainless steel, and the belt 4 has a slack 5 which makes it hang down towards the product conveyor 2. A lifting member 7 comprising two support lines, in this example being chains 8a and 8b, supporting a structure comprising transversal spaced apart rods 9 (of which only one rod is pointed out in the figure). Although the chains 8a and 8b are illustrated as lines, for improved clarity, it should be realised that the chains may comprise links. In this example there are nine rods 9, but there may be fewer or more rods 9. For example there may be 28 rods. The number of rods may vary depending on the length of the shape controlling belt. Each one of the chains 8a and 8b is supported on a rail (not illustrated) which is mounted on an inside wall of the cooking chamber 3. In this example, the chains 8a and 8b are further positioned and stretched by shafts comprising cogs 12a, 12b, 12c and 12d (only illustrated in FIG. 1a), running transversal to the elongation of the product conveyor 2. Other means may be used for positioning and stretching the chains 8a and 8b, such as cog wheels, shafts without cogs, loops, or other suitable means. It may also be possible to operate the device according to the invention without any such means for positioning and stretching the support lines. The lifting member further comprises moving members in the form of two rolls 6a, 6b. The rolls 6a and 6b comprise an axis 11a and 11b, respectively. In FIGS. 1a and 1b, the spaced apart rods are illustrated positioned rolled up on the rolls, and not inserted between the shape-controlling belt and the product conveyor. As a result of this, combined with the fact that the chains 8a and 8b are positioned at a distance from the side of the shape-controlling belt, the shape-controlling belt is slacking and is in the first position. Thus, the device, as illustrated in FIGS. 1a and 1b, is adapted for shape-controlled cooking.

Shifting a part of the lower work path from a first position to a second position, thus shifting the cooking device from being adapted for shape-controlled cooking to non-shape-controlled cooking will now be discussed with references to FIGS. 1a and 1b. The rolls 6a and 6b are rotatable according to this example, for example by means of an electric motor and a gear unit (not illustrated), and when the rolls 6a, 6b are rotated anti-clockwise, the roll 6a is unwinding the chains 8a and 8b and the rods 9, while simultaneously roll 6b is winding the chains 8a and 8b. Thus, the chains 6a and 6b and the rods will be motioned in a direction from left to right in the illustration. It is realised that the rotating can be turning. The chains 8a and 8b and the rods 9 are arranged at a distance above the product conveyor 2. When the rods 9 reaches the nip 13 formed between the shape-controlling belt 4 and the product conveyor 2, the rods 9 will enter the nip transversal to the elongation of the product conveyor 2, and as a result of said distance above the product conveyor 2, the rods 9 will force or lift the slack 5 of the shape-controlling belt 4 upwards and the work-path of the shape-controlling belt 4 will thus be elevated to a higher distance above the product conveyor 2, corresponding to shifting of the lower work-path from the first position to the second position. In FIGS. 1a and 1b the first position is illustrated. The rods 9, which in this example are rotatably attached to the chains 8a and 8b, will rotate and thereby decreasing the friction between the rods 9 and the lower work path, allowing for smoother operation, a longer lasting cooking device, and reduced risk of scraping off foodstuff residues or material from the shape-controlling belt. The second position is described below with references to FIG. 2a or 2b.

FIGS. 2a and 2b illustrate the same cooking device as is illustrated in FIGS. 1a and 1b, and the difference between FIGS. 1a and 1b on one hand and 2a and 2b on the other hand, is that FIGS. 1a and 1b illustrate the cooking device with the lower work-path in the first position; and FIGS. 2a and 2b illustrate the lower work-path in the second position.

In FIGS. 2a and 2b, the chains 8a and 8b and the rods 9 have been motioned in a direction from left to right in the illustration, as compared with FIGS. 1a and 1b, and the rods 9, thus, have been moved from being wound on the roll 6a to being positioned between the product conveyor 2 and the shape-controlling belt 4, where the rods 9 are engaged with a part of the lower work path of the shape-controlling belt, such that it is lifted and is in the second position. The cooking device is thus adapted for non-shape-controlled cooking. As can be seen from the inset, the lower work path of the shape-controlling belt 4, according to this example, may be hanging down between the rods 9. During non-shape-controlled cooking according to the invention, the chains 8a and 8b and the rods 9 will be held essentially motionless in the illustrated positions, but the product conveyor will be moving. The shape-controlling belt may be moving or not moving.

If the rolls 6a and 6b are rotated in clock-wise direction, the chains 8a and 8b and the rods 9 would be motioned to the left in the illustration. The rods 9 would leave their position between the product conveyor 2 and the lower work path of the shape-controlling belt 4. Thus, the lower work path of the shape-controlling belt 4 would not be elevated by the rods 9 and, as a result would slack and shift from the second position to the first position. Thus, the cooking device would shift from being adapted for non-shape-controlled cooking to shape-controlled cooking.

Figure 3:
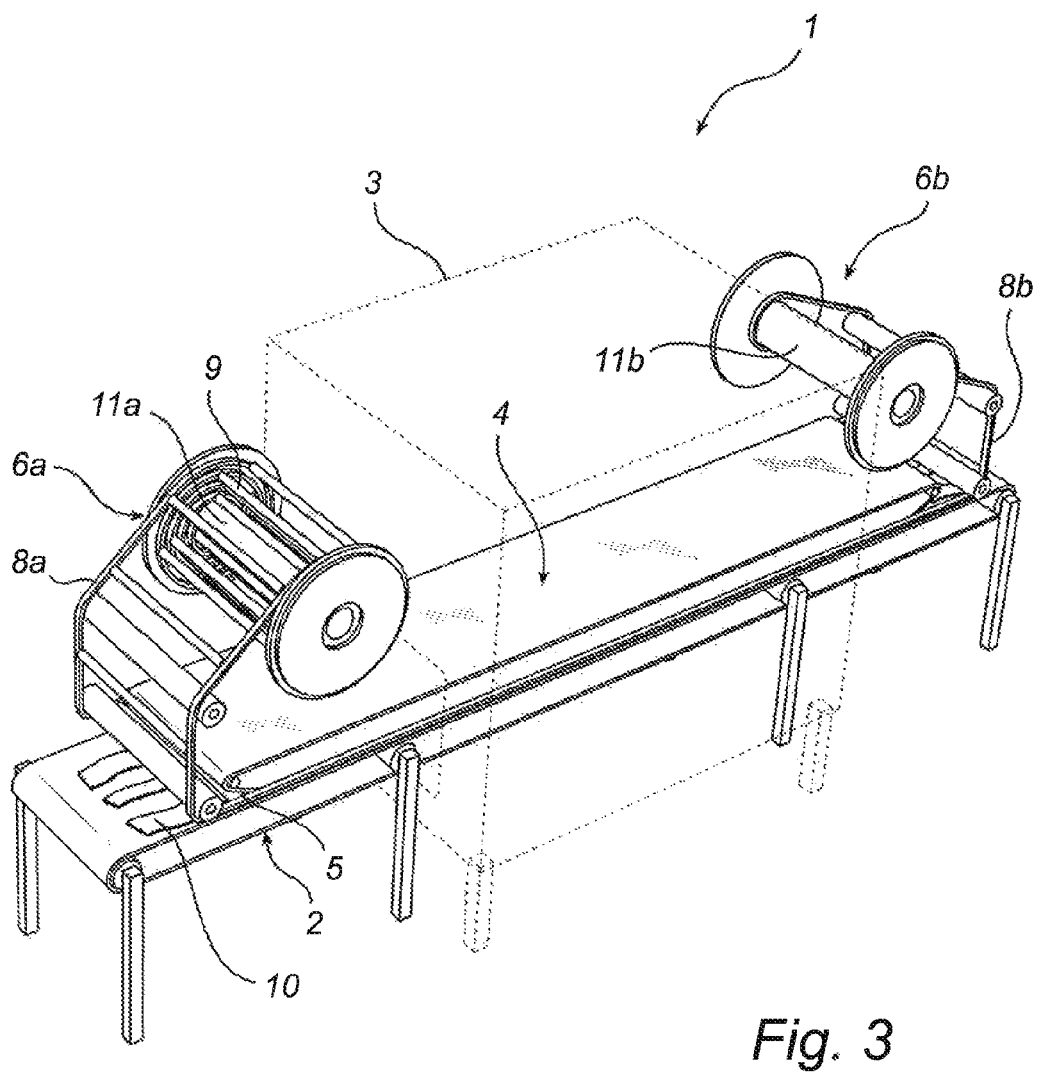
FIG. 3 illustrates a perspective view of the cooking device according to the invention, during baking of bacon.

With reference to FIG. 3, shape-controlled baking of bacon is being discussed below. Shape-controlled baking of bacon, using the device according to the invention, results in bacon which has a flat appearance, in contrast to the wavy appearance typical to bacon being baked without shape-control. FIG. 3 illustrates a cooking device 1 according to the invention with the lower work path in the first position, and thus a slack 5 of the lower work path of the shape-controlling belt. The lower work path is in the first position as a result of the rods 9 not being positioned between the product conveyor 2 and the lower work path of the shape controlling belt 4. Several rods 9 can be seen rolled up on roll 6a, and two rods 9 being outside the roll 6a. It is realised that all rods 9 could have been rolled up on roll 6a, but that, for this example, it is important that the rods are not positioned between the shape-controlling belt 4 and the product belt 2. The chains 8a and 8b are illustrated running alongside, but at a distance from, the shape controlling belt 4. The foodstuffs in this example are slices of bacon 10 (of which only one slice is pointed out in the figure). The slices of bacon 10 are positioned on the product conveyor 2. The product conveyor 2 is motioned such that the slices of bacon 10 are moved to the right in the illustration. The lower work path of the shape-controlling belt 4 is moving at the same speed as the product conveyor 2 and the slices of bacon 10. The slices of bacon 10 will before entering the cooking chamber 3 enter between the product conveyor 2 and the shape-controlling belt 4 and be sandwiched between the two, and the slices of bacon 10 will be in contact with the shape-controlling belt. The slices of bacon 10 are conveyed into the cooking chamber 3 where they are heated and baked. The slices of bacon 10 are limited upwards by the shape-controlling belt and the shape of the slices of bacon 10 are thus controlled, and the slices of bacon 10 are thus not becoming wavy during the baking. Slices of bacon 10 appearing flat are of interest, for example, when positioned on top of hamburgers. For some purposes the slices of bacon 10 are visible when eaten and it is desired that they have a wavy appearance to look appetising. The device according to the invention can be used for efficient baking of both flat and wavy bacon. After flat bacon has been cooked as discussed above, the lower work path may, according to the invention, efficiently be shifted from the first position to the second position (not illustrated) and bacon may be baked such that the slices of bacon 10 obtain a wavy appearance.

In the example discussed directly above, there exists a continues movement of the product conveyor and the shape-controlling belt, and thus a continuous movement of slices of bacon 10 through the cooking chamber 3, and the cooking process may be regarded as a continuous cooking process. New slices of bacon 10 are positioned on the product conveyor at the same pace as the slices of bacon 10 are conveyed into the cooking chamber 3. The cooking device 1 can also be used for batch cooking, in which a batch of slices of bacon 10 would be positioned on the product conveyor and conveyed into the cooking chamber 3 where they are baked. During this baking the movement of the product conveyor 2 and the shape-controlling belt 4 may be stopped during the baking, and started again when the baking is finished, or nearly finished, to convey the slices of bacon 10 out from the cooking chamber 3, while at the same time possibly conveying other, un-cooked, slices of bacon 10 positioned upstream the cooking chamber 3 into the cooking chamber 3. After being conveyed out of the cooking chamber 3, the slices of bacon 10 may be subjected to further treatment, for example seasoning or packing.

The invention claimed is:

1. A cooking device for cooking of foodstuffs, comprising a cooking chamber, a product conveyor, a shape-controlling belt, and a lifting member, the product conveyor being arranged to convey said foodstuffs through said cooking chamber, the shape-controlling belt being an endless belt extending along an upper return path, and a lower work path, the shape-controlling belt having interior surface and an outer, food-engaging surface, the lifting member being arranged to shift a part of the lower work path between a first position in which the shape-controlling belt extending along said part is slacking and the outer, food-engaging surface extending along said part is adopted to contact said foodstuffs on the product conveyor, and a second position in which the outer, food-engaging surface of the shape-controlling belt extending along said part is adopted to be separated from said foodstuffs on the product conveyor, wherein the lifting member comprises a structure supported on at least one lateral side of the shape-controlling belt, said structure being insertable between the shape-controlling belt and the product conveyor such that the structure engages the outer, food-engaging surface of the shape-controlling belt extending along said part in order to shift said part of the work path from said first position to said second position.

2. The cooking device according to claim 1, wherein the lifting member comprises a lateral supporting means arranged on at least one lateral side of the shape-controlling belt, wherein
said lateral supporting means is supporting said structure.

3. The cooking device according to claim 2, wherein the lateral supporting means of said lifting member comprises two support lines, one support line being arranged on each lateral side of the shape-controlling belt, wherein
said structure is transversal spaced apart rods being movable in the longitudinal extension of the product conveyor.

4. The cooking device according to claim 3, wherein said part of the lower work path is a portion of the lower work path or the whole of the lower work path.

5. The cooking device according to claim 1, wherein the product conveyor is a conveyor belt.

6. The cooking device according to claim 1, wherein the shape-controlling belt is movable.

7. The cooking device according to claim 1, wherein the first position of said part of the lower work path results in shape-controlled cooking of foodstuffs, and wherein the second position of said part of the lower work path results in non-shape-controlled cooking.

8. The cooking device according to claim 2, wherein the product conveyor is a conveyor belt.

9. The cooking device according to claim 8, wherein the shape-controlling belt is movable such that when the shape-controlling belt is extending along said lower work path, the shape-controlling belt presents a velocity which corresponds to the velocity with which the foodstuffs are transported.

10. The cooking device according to claim 2, wherein the shape-controlling belt is movable.

11. The cooking device according to claim 2, wherein the first position of said part of the lower work path results in shape-controlled cooking of foodstuffs, and wherein the second position of said part of the lower work path results in non-shape-controlled cooking.

12. The cooking device according to claim 2, wherein said part of the lower work path is a portion of the lower work path or the whole of the lower work path.

13. A method for switching a cooking device between being adapted for shape-controlled cooking and non-shape-controlled cooking of foodstuffs, comprising the step of:
providing a cooking device for cooking of foodstuffs, comprising:
a cooking chamber, a product conveyor, a shape-controlling belt, and a lifting member,
the product conveyor being arranged to convey said foodstuffs through said cooking chamber,
the shape-controlling belt being an endless belt extending along an upper return path, and a lower work path, the shape-controlling belt having interior surface and an outer, food-engaging surface,
a lifting member comprising a structure supported on at least one lateral side of the shape-controlling belt, said structure being insertable between the shape-controlling belt and the product conveyor such that the structure is engageable with the outer, food-engaging surface of the shape-controlling belt;
shifting a part of the lower work path with the lifting member between a first position in which the shape-controlling belt extending along said part is slacking and the outer, food-engaging surface along said part is adopted to contact said foodstuffs for shape-controlled cooking, and a second position in which the outer, food-engaging surface of the shape-controlling belt extending along said part is adopted to be separated from said foodstuffs on the product conveyor for non-shape-controlled cooking.

14. A method for switching a cooking device between being adapted for shape-controlled cooking and non-shape-controlled cooking of foodstuffs, comprising the step of:
providing a cooking device for cooking of foodstuffs, comprising:
a cooking chamber, a product conveyor, a shape-controlling belt, and a lifting member,
the product conveyor being arranged to convey said foodstuffs through said cooking chamber,
the shape-controlling belt being an endless belt extending along an upper return path, and a lower work path, the shape-controlling belt having interior surface and an outer, food-engaging surface,
a lifting member comprising a structure supported on at least one lateral side of the shape-controlling belt, said structure being insertable between the shape-controlling belt and the product conveyor such that the structure is engageable with the outer, food-engaging surface of the shape-controlling belt;
shifting a part of the lower work path with the lifting member between a first position in which the shape-controlling belt extending along said part is slacking and the outer, food-engaging surface along said part is adopted to contact said foodstuffs for shape-controlled cooking, and a second position in which the outer, food-engaging surface of the shape-controlling belt extending along said part is adopted to be separated from said foodstuffs on the product conveyor for non-shape-controlled cooking.

15. The method according to claim 14, wherein the lifting member comprises a lateral supporting means arranged on at least one lateral side of the shape-controlling belt, wherein
said lateral supporting means is supporting said structure.

16. The method according to claim 15, wherein the lateral supporting means of said lifting member comprises two support lines, one support line being arranged on each lateral side of the shape-controlling belt, wherein
said structure is transversal spaced apart rods being movable in the longitudinal extension of the product conveyor.

17. The method according to claim 16, wherein said part of the lower work path is a portion of the lower work path or the whole of the lower work path.

18. The method according to claim 15, wherein the product conveyor is a conveyor belt.

19. The method according to claim 18, wherein the shape-controlling belt is movable such that when the shape-controlling belt is extending along said lower work path, the shape-controlling belt presents a velocity which corresponds to the velocity with which the foodstuffs are transported.

20. The method according to claim 15, wherein the shape-controlling belt is movable.

* * * * *